(12) United States Patent
Eischeid et al.

(10) Patent No.: US 9,495,273 B2
(45) Date of Patent: Nov. 15, 2016

(54) SYSTEMS AND METHODS FOR DISPLAYING BLADE CHASSIS DATA

(75) Inventors: Todd M. Eischeid, Cary, NC (US); Mary S. Johnson, Raleigh, NC (US); Mark E. Molander, Cary, NC (US); Ryan P. Randolph, Rochester, MN (US); Devon D. Snyder, Cary, NC (US)

(73) Assignee: LENOVO ENTERPRISE SOLUTIONS (SINGAPORE) PTE. LTD, Singapore (SG)

( * ) Notice: Subject to any disclaimer, the term of this patent is extended or adjusted under 35 U.S.C. 154(b) by 734 days.

(21) Appl. No.: 13/039,143

(22) Filed: Mar. 2, 2011

(65) Prior Publication Data

US 2012/0226986 A1      Sep. 6, 2012

(51) Int. Cl.
*G06F 15/177*    (2006.01)
*G06F 11/32*    (2006.01)
*G06F 11/30*    (2006.01)

(52) U.S. Cl.
CPC ......... *G06F 11/328* (2013.01); *G06F 11/3006* (2013.01); *G06F 11/3044* (2013.01); *G06F 11/3055* (2013.01)

(58) Field of Classification Search
USPC ....................................................... 715/736
See application file for complete search history.

(56) References Cited

U.S. PATENT DOCUMENTS

| | | | |
|---|---|---|---|
| 6,285,967 B1 * | 9/2001 | Rajan .................... | G06F 11/273 700/115 |
| 6,957,288 B2 * | 10/2005 | Metevier et al. ............. | 710/100 |
| 7,032,037 B2 * | 4/2006 | Garnett ................... | G06F 1/183 709/223 |
| 7,209,347 B2 * | 4/2007 | Liang ........................ | G06F 1/16 361/752 |
| 7,356,770 B1 * | 4/2008 | Jackson ................ | G06F 9/5072 715/735 |
| 7,523,286 B2 * | 4/2009 | Ramany ................ | G06F 3/0605 710/240 |
| 7,619,897 B2 * | 11/2009 | Della Fiora .......... | H05K 7/1494 361/724 |
| 7,702,777 B2 * | 4/2010 | Cromer ..................... | G06F 8/60 709/217 |
| 7,738,242 B2 * | 6/2010 | McGraw ................... | G06F 1/18 312/223.1 |

(Continued)

*Primary Examiner* — William Bashore
*Assistant Examiner* — Henry Orr
(74) *Attorney, Agent, or Firm* — Katherine S. Brown; Andrew M. Calderon; Roberts Mlotkowski Safran, Cole & Caldeon, P.C.

(57) ABSTRACT

Systems and methods for displaying blade chassis data are provided. One system includes a memory for storing computer code comprising a blade chassis information module and a processor capable of being in communication with a blade chassis. The processor, when executing the computer code comprising the blade chassis information module, is configured to receive the blade chassis data, create a user interface for the blade chassis data, and display the blade chassis data on the user interface. One method includes receiving blade chassis data, creating a user interface for the blade chassis data, and displaying the blade chassis data on the user interface. Also provided are physical computer storage mediums including a computer program product for performing the above method.

20 Claims, 9 Drawing Sheets

(56) References Cited

U.S. PATENT DOCUMENTS

| | | | |
|---|---|---|---|
| 8,171,142 B2* | 5/2012 | Kolin et al. | 709/226 |
| 8,194,534 B2* | 6/2012 | Pandey | H04L 49/70 370/216 |
| 2004/0177182 A1* | 9/2004 | Metevier | G11B 19/041 710/100 |
| 2005/0080891 A1* | 4/2005 | Cauthron | G06F 11/2023 709/223 |
| 2005/0182601 A1* | 8/2005 | Deguchi | G06N 5/025 703/1 |
| 2006/0031448 A1* | 2/2006 | Chu | G06F 9/5061 709/223 |
| 2006/0241907 A1* | 10/2006 | Armstrong | G05B 23/0218 702/182 |
| 2007/0005382 A1* | 1/2007 | Sayers | G06Q 10/06 715/738 |
| 2007/0027948 A1* | 2/2007 | Engebretsen | G06F 1/181 709/203 |
| 2007/0089446 A1* | 4/2007 | Larson | G05D 23/1931 62/259.2 |
| 2007/0222597 A1* | 9/2007 | Tourrilhes | G06Q 10/06 340/572.1 |
| 2008/0215844 A1* | 9/2008 | Thomas | G06F 9/4413 711/170 |
| 2009/0113323 A1* | 4/2009 | Zhao | G06Q 10/10 715/764 |
| 2009/0158081 A1* | 6/2009 | Dake | G06F 11/2028 714/3 |
| 2009/0222677 A1 | 9/2009 | Astigarraga et al. | |
| 2012/0005344 A1* | 1/2012 | Kolin | H05K 7/20836 709/226 |
| 2012/0185590 A1* | 7/2012 | Kolin et al. | 709/224 |

* cited by examiner

SYSTEMS AND METHODS FOR DISPLAYING BLADE CHASSIS DATA

BACKGROUND OF THE INVENTION

1. Field of the Invention

The present invention relates generally to computing systems, and more particularly to, systems and methods for displaying blade chassis data on a user interface.

2. Description of the Related Art

Many contemporary computing systems utilize a blade chassis to store various types of server blades. While operating, contemporary computing systems typically only provide a physical representation of the blade chassis to a user located remotely to the blade chassis. Even though the physical representation of the blade chassis is useful, a physical representation of the blade chassis does not provide all of the information to a user that the user might desire to know about the blades chassis.

SUMMARY OF THE INVENTION

Various embodiments provide systems for displaying blade chassis data on a user interface. One system comprises a memory configured to store computer code comprising a blade chassis information module and a processor coupled to the memory and capable of being in communication with a blade chassis. In one embodiment, the processor, when executing the computer code comprising the blade chassis information module, is configured to receive the blade chassis data, create a user interface for the blade chassis data, and display the blade chassis data on the user interface.

Other embodiments provide methods for displaying blade chassis data in a system in communication with a blade chassis. One method comprises receiving, by a processor, blade chassis data, creating a user interface for the blade chassis data, and displaying the blade chassis data on the user interface.

Physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for displaying blade chassis data in a system in communication with a blade chassis are also provided. One physical computer storage medium comprises computer code for receiving, by a processor, blade chassis data, computer code for creating, by the processor, a user interface for the blade chassis data, and computer code for displaying the blade chassis data on the user interface.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide systems and methods for displaying blade chassis data on a user interface. Also provided are physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for displaying blade chassis data on a user interface.

Figure 1:
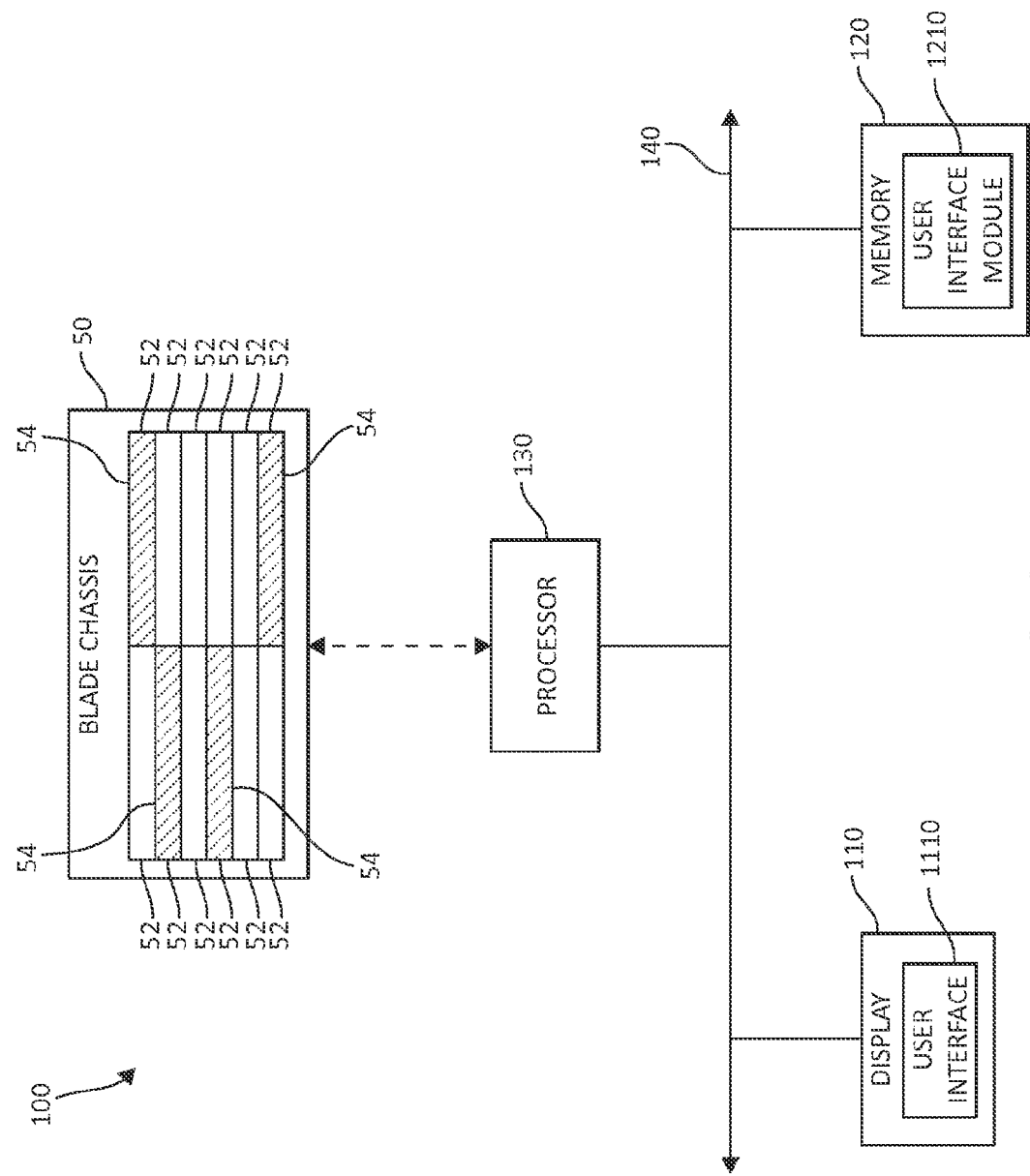
FIG. 1 is a block diagram of one embodiment of a system for displaying blade chassis data on a user interface.

Turning now to the figures, FIG. 1 is a block diagram of one embodiment of a system 100 for displaying blade chassis data from a blade chassis 50. At least in the illustrated embodiment, system 100 comprises a display 110, memory 120, and a processor 130 coupled to one another via a bus 140 (e.g., a wired and/or wireless bus). In addition, processor 130 is in communication with or is capable of being in communication with blade chassis 50.

Blade chassis 50 may be included as a portion of system 100 or may be external to system 100. Furthermore, blade chassis 50 may be any blade chassis known in the art or developed in the future. That is, blade chassis 50 may be any type of chassis comprising one or more blade (or module) slots 52 (or bays) capable of housing one or more blades 54.

The one or more blades 54 may be any type of blade known in the art of developed in the future. Examples of blades 54 include, but are not limited to, server blades, storage blades, network switch modules, storage switch module, memory blades, CPU blades, management blades, and the like blades.

Display 110 may be any system and/or device capable of presenting a user interface 1110 (discussed below) to a user. In one embodiment, display 110 comprises a touch screen such that display 110 is capable of receiving user inputs. In other embodiments, display 110 is coupled to one or more input devices (e.g., a mouse, a keyboard, a microphone, etc.). The computer code utilized to produce user interface 1110 is stored in memory 120.

Memory 120 may be any system and/or device capable of storing data. In one embodiment, memory 250 stores computer code comprising a user interface module 1210. User interface module 1210 comprises instructions that, when executed by processor 130, causes processor 130 to perform a method of displaying blade chassis data via user interface 1110 on display 110.

Processor 130 is configured to execute the computer code comprising user interface module 1210. When executing user interface module 1210, processor 130 is configured to create user interface 1110 on display 110. In various embodiments, user interface 1110 comprises an electronic representation of blade chassis 50. That is, user interface 1110 presents an electronic representation of the blade slots 52 and/or blades 54 in blade chassis 50 along with information related to blade slots 52 and/or blades 54. To populate user interface 1110, processor 130 is configured to receive blade chassis data related to blade chassis 50 and command display 110 to display the blade chassis data on user interface 1110.

Figure 2:
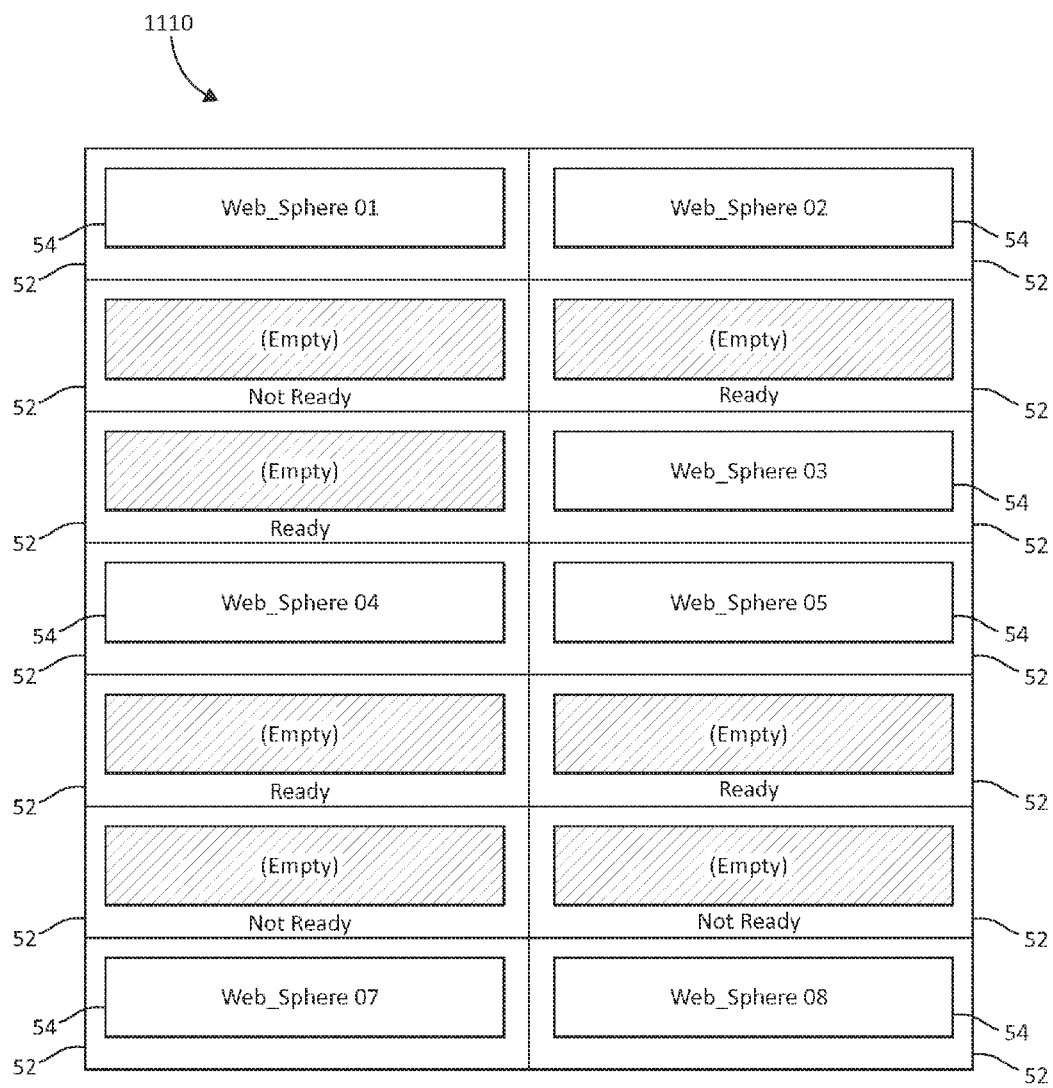
FIG. 2 is a diagram of one embodiment of the user interface in FIG. 1.

In various embodiments, user interface 1110 presents an electronic representation of the blade slots 52 and blades 54 in blade chassis 50. In one embodiment (see FIG. 2), user interface 1110 provides a populated/empty status for each blade slot 52. That is, if a particular blade slot 52 has a blade 54 inserted within it, user interface 1110 indicates that the particular blade slot 52 is populated with a blade 54. User interface 1110 may automatically indicate (e.g., displays a new blade image) that a particular blade slot 52 is populated when a blade 54 is inserted within the particular blade slot 52 or may be configured to have a user manually update user interface 1110 when the blade 54 is inserted within the particular blade slot 52. In addition, if the particular blade slot 52 does not have a blade 54 inserted within it, user interface 1110 indicates that the particular blade slot 52 is empty In another embodiment (see also FIG. 2), user interface 1110 provides a ready/not ready status for insertion of a blade 54 for each blade slot 52. That is, if a particular empty blade slot 52 is prepared or capable of receiving a blade 54, user interface 1110 indicates that the particular blade slot 52 is ready for blade insertion. Alternatively, if the particular empty blade slot 52 is not prepared or incapable of receiving a blade 54, user interface 1110 indicates that the particular blade slot 52 is not ready for blade insertion. As expressly illustrated in FIG. 2, the various embodiments of user interface 1110 may provide both the populated/empty status for each blade slot 52 and the ready/not ready status for each empty blade slot 52.

Figure 3:
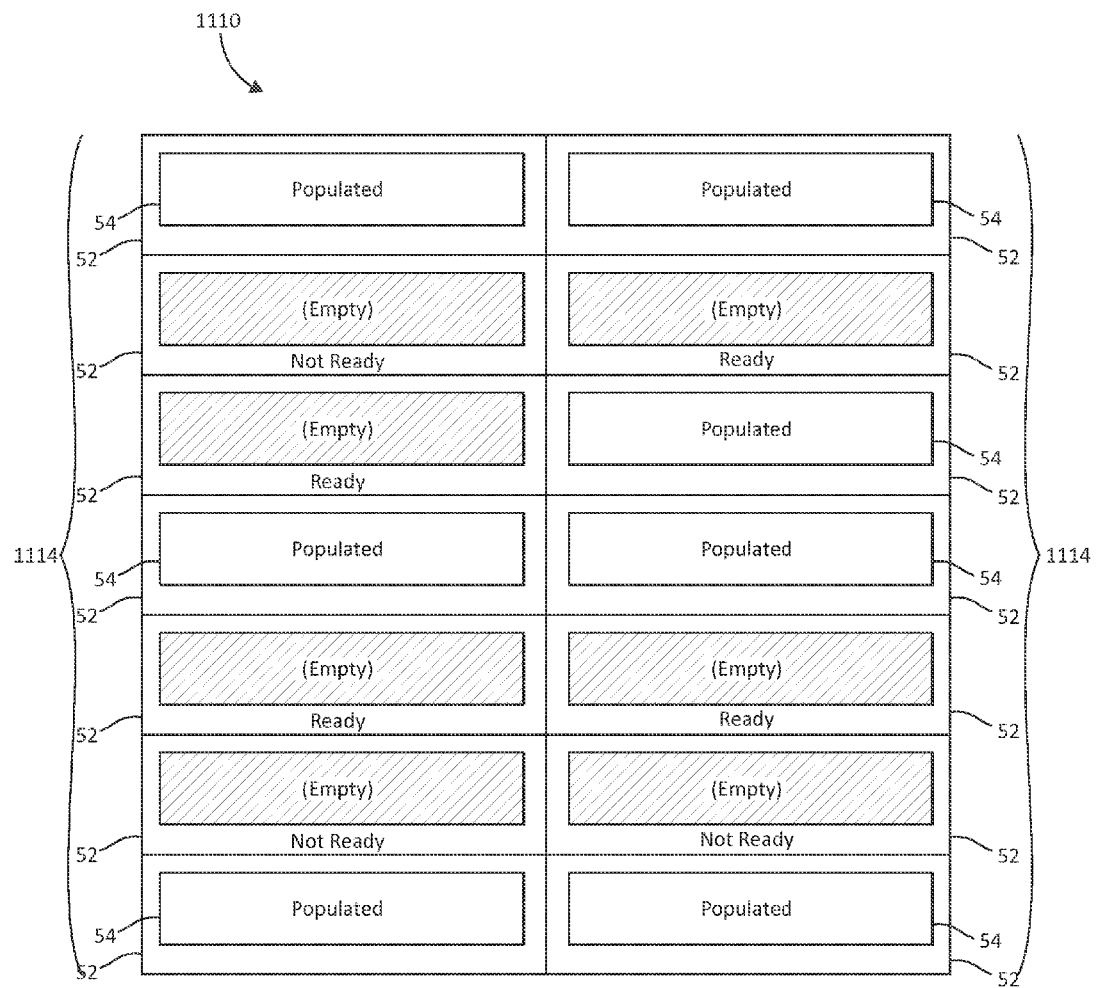
FIG. 3 is a diagram of the user interface in FIG. 2 illustrating one embodiment of a first layer within the user interface.
Figure 4:
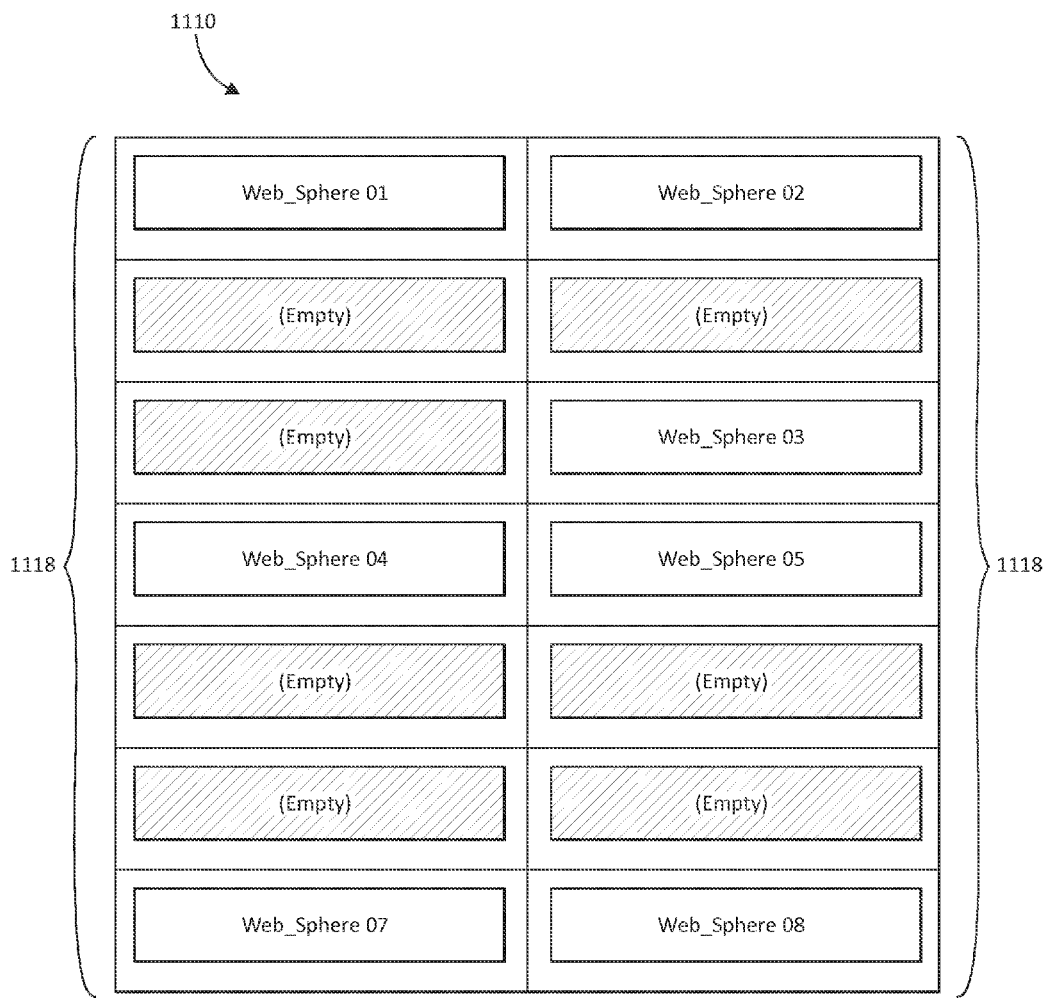
FIG. 4 is a diagram of the user interface in FIG. 2 illustrating an embodiment of a second layer within the user interface.

In an alternative embodiment (see also FIG. 2), blade slots 52 and blades 54 are electronically represented on different layers of user interface 1110. For example, blade slots 52 may be represented at a first level and blades 54 are represented at a second level, each capable of being viewed and/or modified independently of one another. In other words, a user is capable of viewing the status of each blade slot 52 in first level 1114 (see FIG. 3) without viewing the status of each blade 54 on second level 1118 (see FIG. 4). Similarly, the user is capable of viewing the status of each blade 54 in second level 1118 (see FIG. 4) without viewing the status of each blade slot 52 on first level 1114 (see FIG. 3).

In yet another embodiment (see FIG. 5), user interface 1110 provides information related to the type of blade 54 each blade slot 52 is configured to house. For example, a particular blade slot 52 may only be capable of housing a particular type of blade 54 (e.g., a storage blade, a Web Sphere blade, a server blade, etc.). As such, user interface 1110 provides a visual indication (e.g., an alphanumeric indication, a color indication, a shape indication, a size indication, a pattern indication, and/or the like visual indication) of such blade type.

Figure 6:
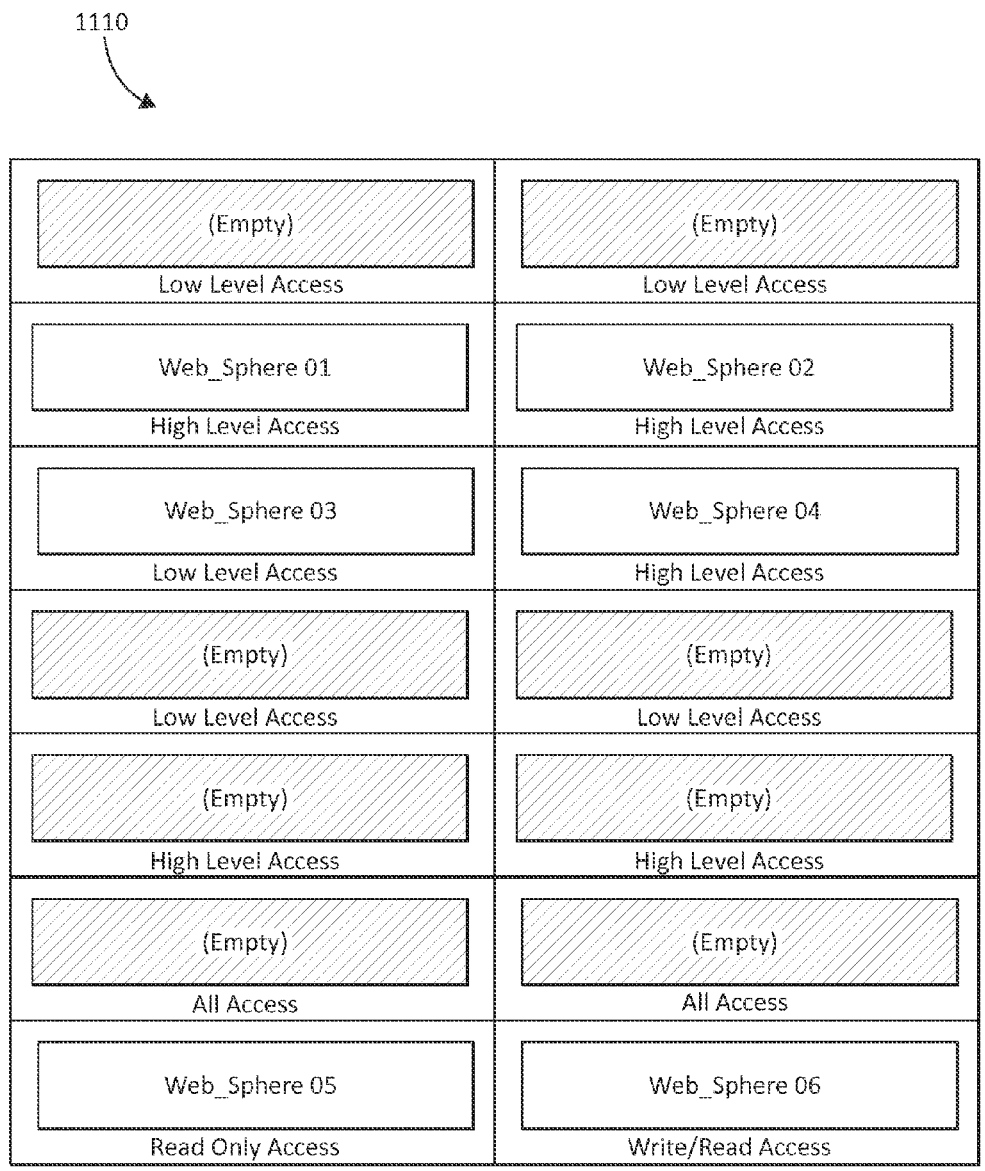
FIG. 6 is a diagram of yet another embodiment of the user interface in FIG. 1.

In still another embodiment (see FIG. 6), user interface 1110 provides information related to permissions for each blade slot 52. For example, user interface 1110 may provide a visual indication (e.g., an alphanumeric indication, a color indication, a shape indication, a size indication, a pattern indication, and/or the like visual indication) of whether a particular user or class of users is able to access each blade slot 52. User interface 1110 may also provide a visual indication of what type(s) of action a particular user or class of users is able to perform on each blade slot 52.

Figure 5:
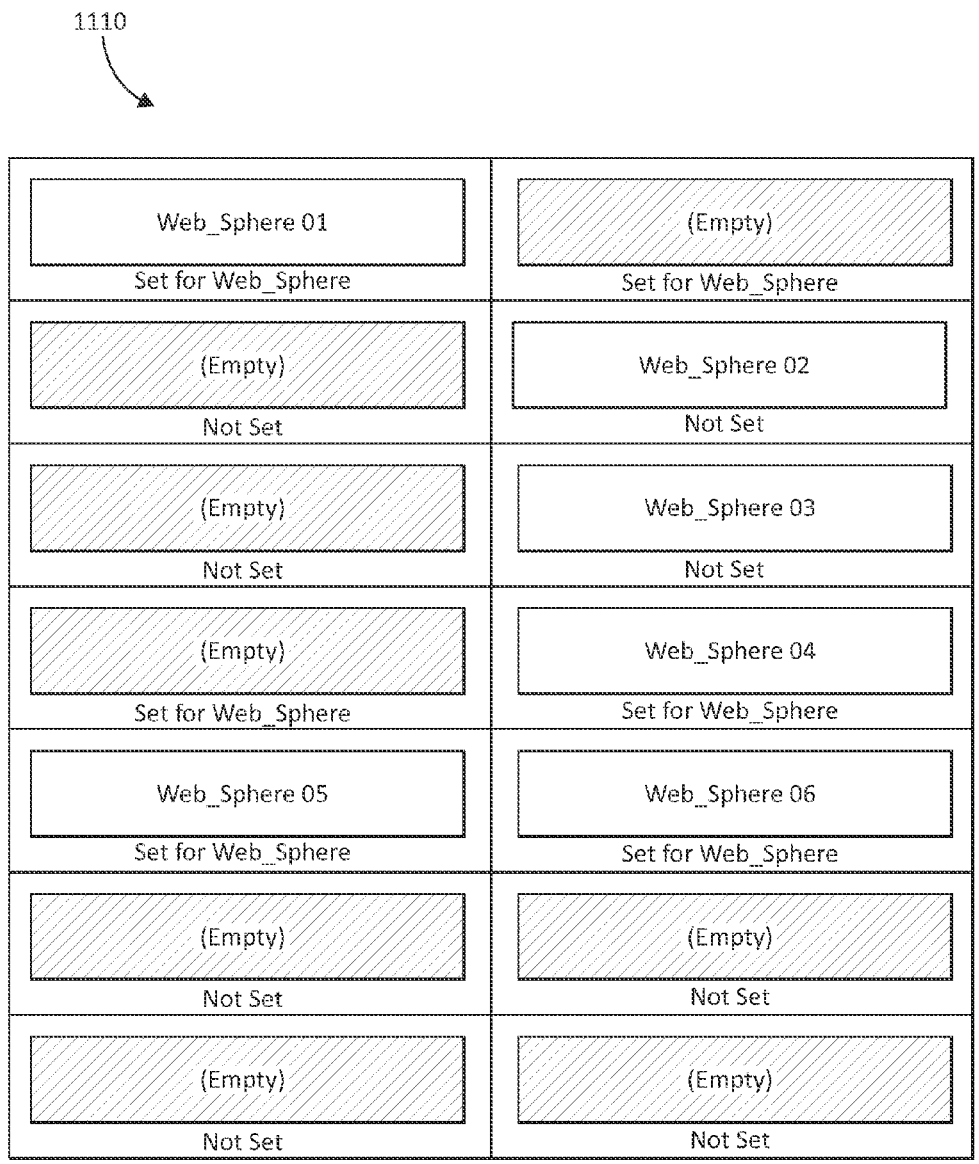
FIG. 5 is a diagram of another embodiment of the user interface in FIG. 1.
Figure 7:
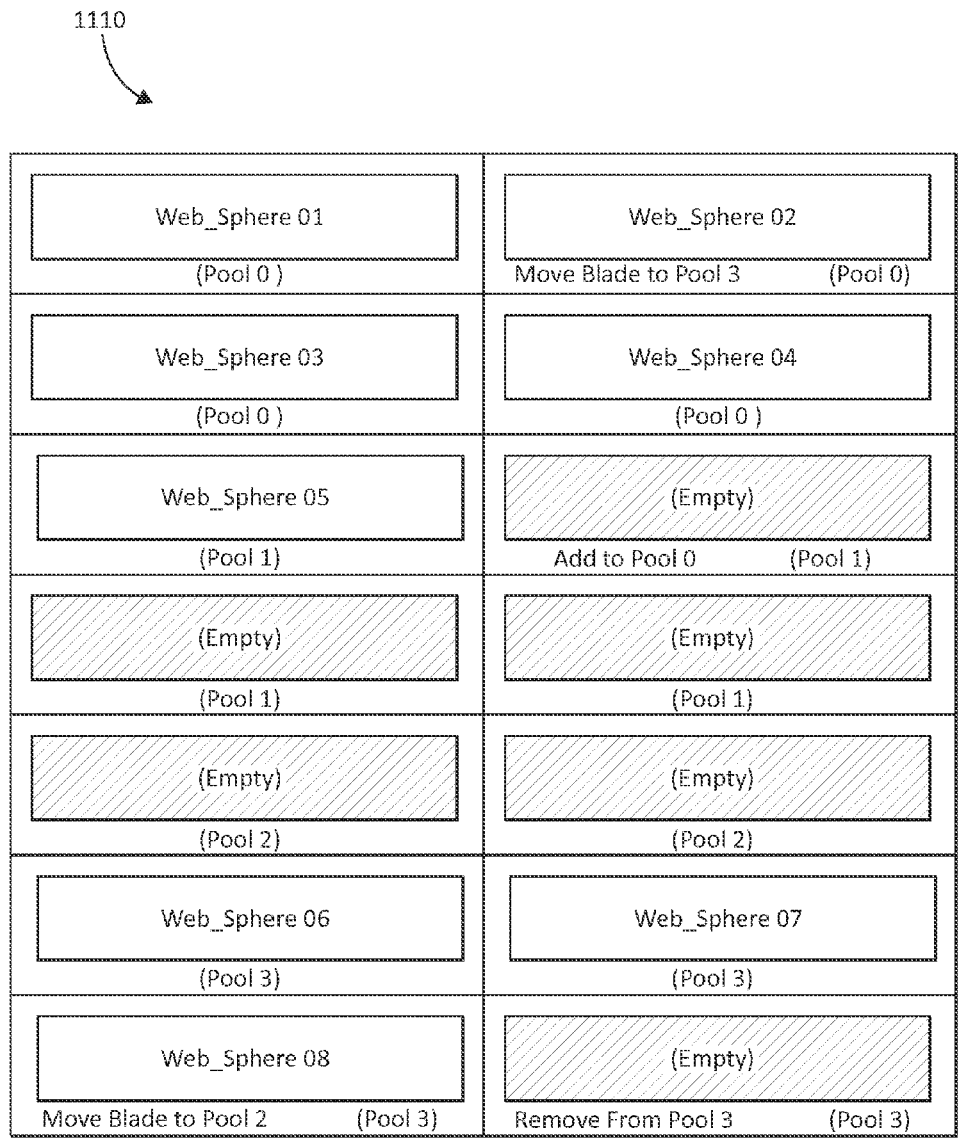
FIG. 7 is a diagram of still another embodiment of the user interface in FIG. 1.

In an alternative embodiment (see FIG. 7), user interface 1110 displays blade pool information. Specifically, user interface 1110 provides a visual indication (e.g., an alphanumeric indication, a color indication, a shape indication, a size indication, a pattern indication, and/or the like visual indication) indicative of which blades 54 form a pool of blades 54. As illustrated in FIG. 5, a first set of blades 54 may form a first pool 542 of blades 54 and a second set of blades 54 form a second pool 544 of blades 54. Furthermore, user interface 1110 may provide a visual indication that a particular blade slot 52 is reserved and ready for a blade 54 (e.g., a storage blade) and will automatically be included within and expand the capacity of an existing pool of storage blades.

In another embodiment (see also FIG. 7), user interface 1110 provides recommendations to the user. For example, user interface 1110 may provide a visual indication (e.g., an alphanumeric indication, a color indication, a shape indication, a size indication, a pattern indication, and/or the like visual indication) recommending how one or more pools of blades (e.g., first pool 542 of blades 54 and/or second set of blades 54) should be modified (e.g., add a blade 54, subtract a blade 54, modify which blades 54 form the blade pool, and/or the like recommendations). In another example, user interface 1110 may provide a visual indication recommending how the data stored in blades 54 may be redistributed to promote more efficient load balancing and/or to indicate where newly received data should be stored to promote more efficient load balancing. In still another example, user interface 1110 may provide a visual indication recommending a blade slot 52 within which a particular blade 54 should be inserted.

Figure 8:
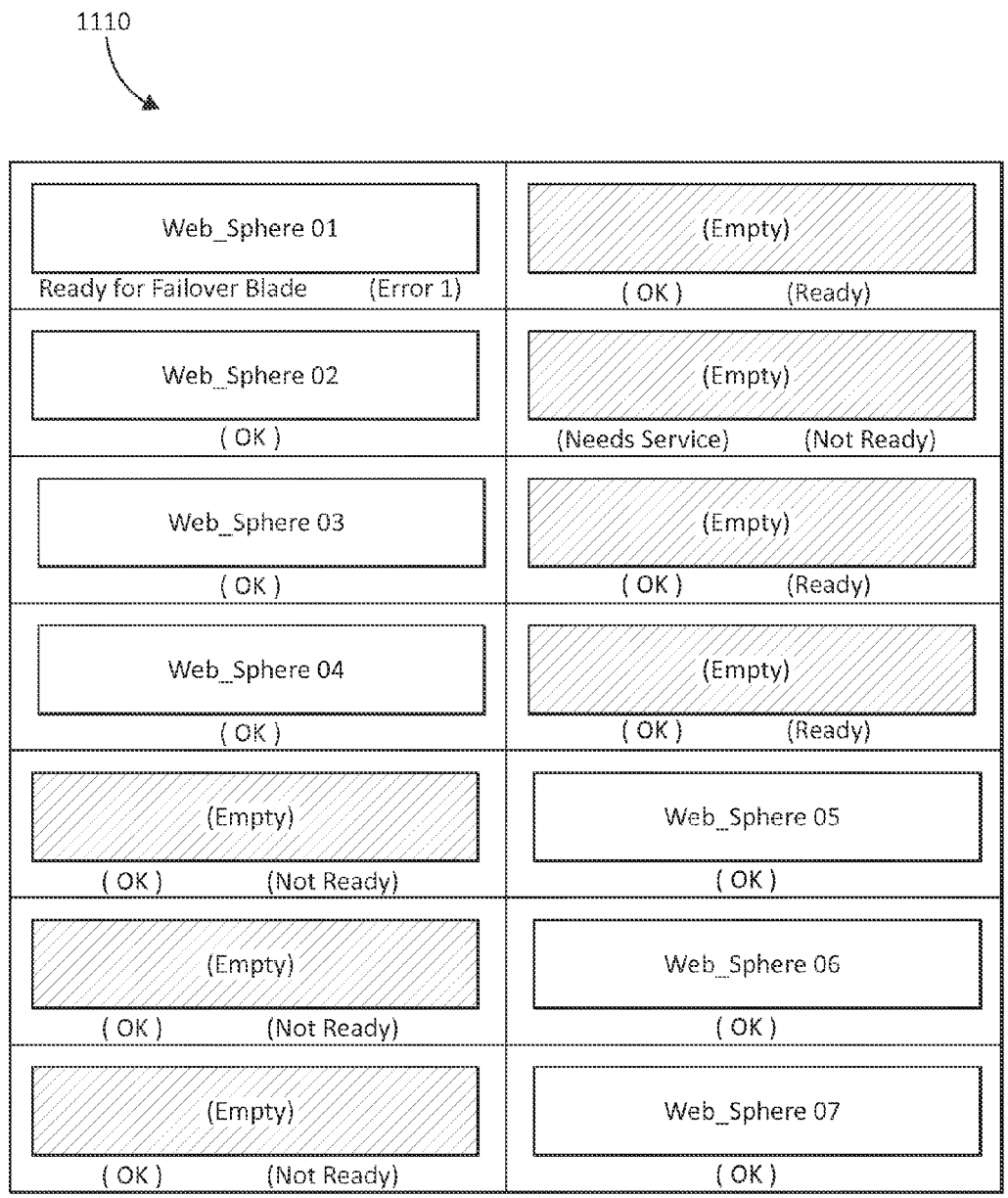
FIG. 8 is a diagram of an alternative embodiment of the user interface in FIG. 1.

In yet another embodiment (see FIG. 8), user interface 1110 provides health status of each blade 54 to the user. For example, user interface 1110 may provide a visual indication (e.g., an alphanumeric indication, a color indication, a shape indication, a size indication, a pattern indication, and/or the like visual indication) that one or more blades 54 is malfunctioning or otherwise not functioning properly. Furthermore, user interface 1110 may provide a visual indication that a failover blade 54 needs to be inserted within a particular blade slot 52 to repair/correct a detected and/or reported malfunction and/or that the particular blade slot 52 is prepared or ready for the failover blade to be inserted.

Though the various embodiments illustrated in FIGS. 2-8 are shown as separate embodiments, the various features illustrated in FIGS. 2-8 may be mixed and matched in any manner to form a desired configuration. Furthermore, one embodiment comprises all of the features illustrated and described with respect to FIGS. 2-8.

Figure 9:
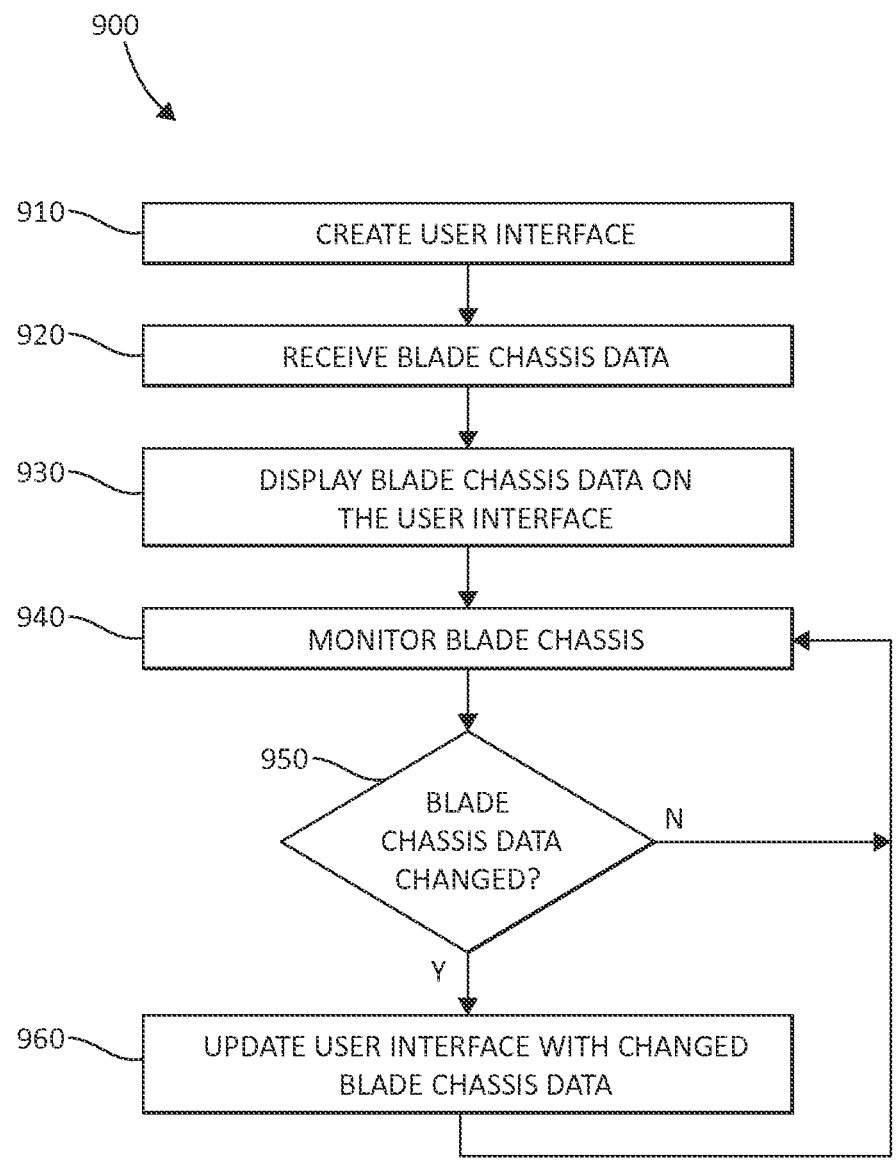
FIG. 9 is a flow diagram of one embodiment of a method for displaying blade chassis data on a user interface.

Turning now to FIG. 9, FIG. 9 is a flow diagram of one embodiment of a method 900 for displaying blade chassis data from a blade chassis (e.g., blade chassis 50). At least in the illustrated embodiment, method 900 begins by a processor (e.g., processor 130) creating a user interface (e.g., user interface 1110) (block 910).

Method 900 further comprises receiving blade chassis data from the blade chassis (block 920) and displaying the blade chassis data on the user interface (block 930). Method 900 continues by monitoring (e.g., by the processor) the blade chassis (block 940) and determining if the blade chassis data has changed (block 950).

If the blade chassis data has not changed, method 900 continues to monitor the blade chassis (block 940). If the blade chassis data has changed, method 900 updates the user interface with the changed blade chassis data (block 970) and continues to monitor the blade chassis (block 940).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A system for displaying blade chassis data, comprising:
   a memory configured to store computer code comprising a blade chassis information module; and
   a processor coupled to the memory and capable of being in communication with a blade chassis, wherein the processor, when executing the computer code comprising the blade chassis information module, is configured to:
   receive the blade chassis data,
   create a user interface for the blade chassis data,
   display the blade chassis data on the user interface,
   display, on the user interface, a populated/empty status for each slot of the blade chassis,
   display, on the user interface, a ready/not ready blade insertion status for each empty slot, the not ready blade insertion status indicating that an empty slot is not ready to have a blade inserted therein,
   display a storage load balancing recommendation on the user interface, and
   display a modification recommendation, the modification recommendation comprising a recommendation to one of add, subtract, and move a blade to/from a particular slot in the blade chassis on the user interface to balance the storage load.

2. The system of claim 1, wherein the processor is configured to display a blade type setting for each slot of the blade chassis on the user interface.

3. The system of claim 1, wherein the processor is configured to display a permission setting for each slot of the blade chassis on the user interface.

4. The system of claim 1, wherein the processor is configured to display one or more blade pools, each blade pool comprising a plurality of blades, in the blade chassis on the user interface.

5. The system of claim 1, wherein the processor is configured to automatically display a new blade image for each slot of the blade chassis on the user interface when the new blade is inserted.

6. A method for displaying blade chassis data in a system in communication with a blade chassis, the method comprising:
   receiving, by a processor, blade chassis data;
   creating, by the processor, a user interface for the blade chassis data;
   displaying the blade chassis data on the user interface;
   displaying, on the user interface, a populated/empty status for each slot of the blade chassis;
   displaying, on the user interface, a ready/not ready blade insertion status for each empty slot, the not ready blade insertion status indicating that an empty slot is not ready to have a blade inserted therein;
   displaying a storage load balancing recommendation on the user interface; and
   displaying a modification recommendation, the modification recommendation comprising a recommendation to one of add, subtract, and move a blade to/from a particular slot in the blade chassis on the user interface to balance the storage load.

7. The method of claim 6, wherein displaying the blade chassis data comprises displaying a blade type setting for each slot of the blade chassis on the user interface.

8. The method of claim 6, wherein displaying the blade chassis data comprises displaying a permission setting for each slot of the blade chassis on the user interface.

9. The method of claim 6, wherein displaying the blade chassis data comprises displaying one or more blade pools, each blade pool comprising a plurality of blades, in the blade chassis on the user interface.

10. The method of claim 6, wherein displaying the blade chassis data comprises automatically displaying a new blade image for each slot of the blade chassis on the user interface when the new blade is inserted.

11. A method for creating a user interface for a blade chassis including a plurality of blade slots populating one or more blades, comprising:
    receiving, by a processor, first data related to the plurality of blade slots, the first data indicating a populated/empty status for each slot of the blade chassis;
    receiving, by the processor, second data related to the one or more blades, the second data indicating a ready/not ready blade insertion status for each empty slot, the not ready blade insertion status indicating that an empty slot is not ready to have a blade inserted therein;
    populating the user interface with the first data at a first level;
    populating the user interface with the second data at a second level;
    populating the user interface with a storage load balancing recommendation;
    populating the user interface with a modification recommendation, the modification recommendation comprising a recommendation to one of add, subtract, and move a blade to/from a particular slot in the blade chassis to balance the storage load; and
    displaying the user interface to a user.

12. The method of claim 11, wherein displaying the user interface to the user comprises:
    receiving a first user input; and
    displaying the first data at the first level without displaying the second data at the second level in response to receiving the first user input.

13. The method of claim 12, wherein displaying the user interface to the user comprises:
    receiving a second user input; and
    displaying the second data at the second level without displaying the first data at the first level in response to receiving the second user input.

14. The method of claim 11, wherein displaying the user interface to the user comprises:
    receiving a user input; and
    displaying the second data at the second level without displaying the first data at the first level in response to receiving the user input.

15. The method of claim 11, wherein displaying the user interface to the user comprises:
    displaying the first data at the first level; and
    simultaneously displaying the second data at the second level.

16. A physical computer storage memory comprising a computer program product method for displaying blade chassis data in a system in communication with a blade chassis, the physical computer storage memory comprising:
    computer code for receiving, by a processor, blade chassis data;

computer code for creating, by the processor, a user interface for the blade chassis data;

computer code for displaying the blade chassis data on the user interface;

computer code for displaying on the user interface a populated/empty status for each slot of the blade chassis;

computer code for displaying on the user interface a ready/not ready blade insertion status for each empty slot, the not ready blade insertion status indicating that an empty slot is not ready to have a blade inserted therein;

computer code for displaying a storage load balancing recommendation on the user interface; and computer code for displaying a modification recommendation, the modification recommendation comprising a recommendation to one of add, subtract, and move a blade to/from a particular slot in the blade chassis on the user interface to balance the storage load.

17. The physical computer storage memory of claim 16, wherein the computer code for displaying the blade chassis data comprises:

computer code for automatically displaying a new blade image for each slot of the blade chassis on the user interface when the new blade is inserted.

18. The physical computer storage memory of claim 16, wherein the computer code for displaying the blade chassis data comprises computer code for displaying a blade type setting for each slot of the blade chassis on the user interface.

19. The physical computer storage memory of claim 16, wherein the computer code for displaying the blade chassis data comprises displaying a permission setting for each slot of the blade chassis on the user interface.

20. The physical computer storage memory of claim 16, wherein the computer code for displaying the blade chassis data comprises displaying one or more blade pools, each blade pool comprising a plurality of blades, in the blade chassis on the user interface.

* * * * *